(12) United States Patent
Ströbel et al.

(10) Patent No.: US 8,258,660 B2
(45) Date of Patent: Sep. 4, 2012

(54) STATOR ARRANGEMENT FOR AN ELECTRIC MOTOR

(75) Inventors: Othmar Ströbel, Schrozberg (DE); Dieter Best, Ingelfingen (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 117 days.

(21) Appl. No.: 12/896,058

(22) Filed: Oct. 1, 2010

(65) Prior Publication Data

US 2011/0080072 A1 Apr. 7, 2011

(30) Foreign Application Priority Data

Oct. 1, 2009 (EP) ..................................... 09171973

(51) Int. Cl.
*H02K 11/00* (2006.01)
(52) U.S. Cl. ..................................................... 310/68 C
(58) Field of Classification Search ................. 310/68 C, 310/68 R, 71, 270
See application file for complete search history.

(56) References Cited

U.S. PATENT DOCUMENTS

| | | | | |
|---|---|---|---|---|
| 6,153,954 A * | 11/2000 | Uchida et al. | ............... | 310/68 C |
| 7,402,925 B2 * | 7/2008 | Best et al. | ................... | 310/68 C |
| 7,456,531 B2 * | 11/2008 | Yagi | ............................. | 310/68 R |
| 7,535,136 B2 * | 5/2009 | Rush et al. | .................. | 310/68 C |
| 7,633,197 B2 * | 12/2009 | Isoda et al. | .................. | 310/68 C |
| 7,759,831 B2 * | 7/2010 | Yagi | ............................. | 310/68 R |
| 7,804,209 B2 * | 9/2010 | Olkanen et al. | ............. | 310/68 B |
| 7,815,368 B2 * | 10/2010 | Sasaki et al. | .................. | 374/152 |
| 8,022,584 B2 * | 9/2011 | Heim | .......................... | 310/68 C |

FOREIGN PATENT DOCUMENTS

| | | |
|---|---|---|
| DE | 20 2007 007 391 | 10/2008 |
| EP | 2 043 234 | 4/2009 |
| EP | 2 066 008 | 6/2009 |
| JP | 2009-50096 | 3/2009 |

* cited by examiner

*Primary Examiner* — Thanh Lam
(74) *Attorney, Agent, or Firm* — Brinks Hofer Gilson & Lione

(57) ABSTRACT

A stator arrangement for an electric motor. The stator arrangement including a laminated stator core with stator windings running through stator grooves and forming winding overhangs at each end face of the laminated stator core. The stator arrangement also includes an interconnection unit having a switching disk covering the winding overhangs on one end face of the stator. The switching disk further including at least one temperature monitor mounted thereon for monitoring the temperature of the stator windings. The temperature monitor being seated in a holding pocket that is resiliently connected to the switching disk in such a manner that, when positioned in one of the stator grooves, it is resiliently biased into engagement with a stator winding.

18 Claims, 5 Drawing Sheets

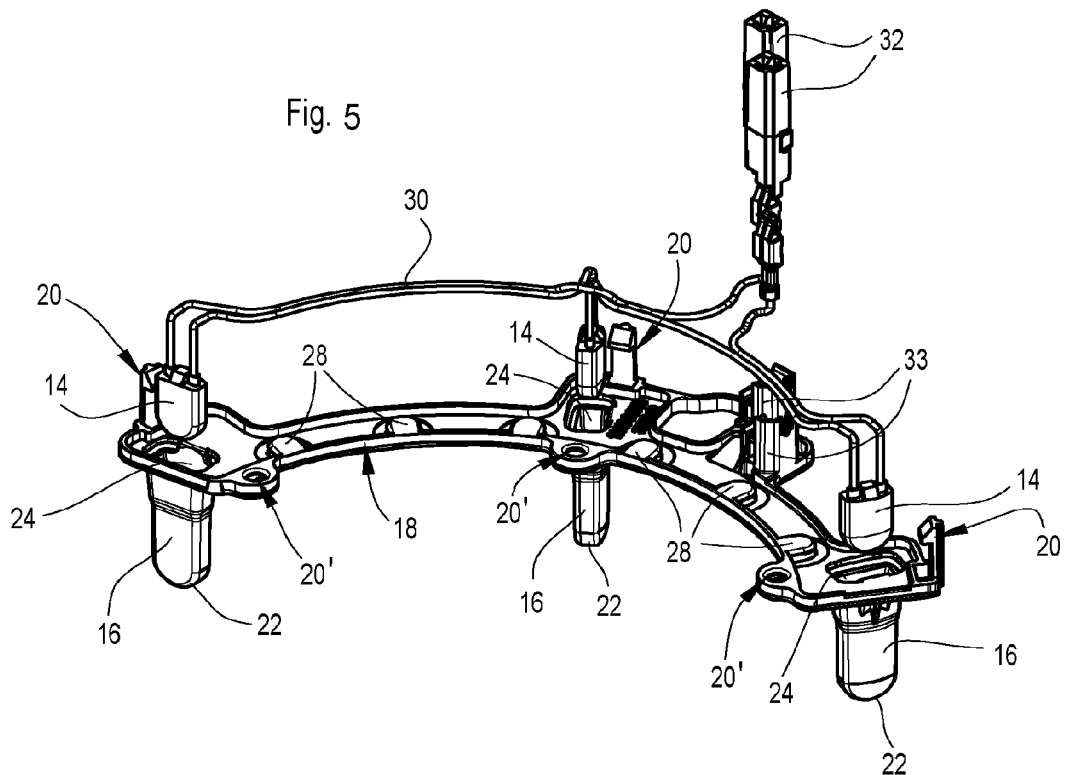

STATOR ARRANGEMENT FOR AN ELECTRIC MOTOR

BACKGROUND

The present invention relates to a stator arrangement for an electric motor. More particularly, the invention relates to a stator arrangement having a temperature monitor that is provided so as to monitor the temperature of a stator winding in the stator arrangement.

An electric motor with a stator arrangement is described in the document EP 2043234 A1. The unit consists of a laminated stator core wound with the stator windings. A switching disk covers a winding overhang and is connected to the motor electronics during assembly of the motor by axial joining via electrical plug connections. On the side facing the winding overhang, the switching disk includes at least one so-called temperature monitor that is intended to detect the respective stator temperature in order to effect a shut-off of the motor or the stator windings in case of overheating of the stator windings due to a malfunction.

In known electric motors, the temperature monitor is typically arranged such that it is intended to rest against the winding overhang on the respective stator winding. This is often not accomplished in practice because, due to manufacturing tolerances, there can be an undefined contact between the temperature monitor and the winding, or even an air gap between these two elements. Therefore, serious malfunctions, or even a total failure of the motor, can occur due to inaccurate temperature detection. Moreover, the temperature monitor/monitors must frequently be manually wired, which leads to expensive manufacturing costs.

SUMMARY OF THE INVENTION

According to the principles of the present invention, a stator arrangement is provided with a temperature monitor and can be easily and quickly assembled, and provides increased safety against temperature-induced malfunctions and damage.

Accordingly, it is provided according to the present invention that the temperature monitor is seated in a holding pocket that is connected resiliently and movably to the switching disk in such a manner that it (the temperature monitor) is located, via the holding pocket, in one of the stator grooves and comes into contact with the stator winding under the effect of a resilient pretension or biasing force. The holding pocket is matched in shape to the groove and winding geometry in such a manner that it engages axially and relatively far (deeply) into the stator groove and can tightly contact (adapt to) the winding with a defined pressing force over a large area, due to its spring-elastic mobility. The temperature monitor is inserted into the holding pocket with zero clearance in a force fitting manner so that it is tightly seated in the holding pocket, almost without an air gap. At least on the side of the holding pocket facing the respective stator winding, the holding pocket has a wall formed sufficiently thin such that the temperature monitor indirectly comes into thermally conductive surface contact with the stator winding.

Due to the spring-elastic mobility of the temperature monitor seated in the holding pocket, a required minimum contact force on the stator winding is always assured, compensating for manufacturing tolerances, which leads to optimal heat transfer. In addition, the heat detection inside the stator groove is particularly secure, in contrast to the detection on the winding overhang, so that increased safety is guaranteed due to reliable shutdown of the stator arrangement in case of overheating.

The holding pocket is preferably constructed of an electrically insulating plastic material. By forming at least the pocket wall that comes into contact with the stator winding very thinly, e.g., with a thickness of only a few tenths of a millimeter (in particular, approximately 0.4 mm), sufficiently good heat transfer between the winding and the temperature monitor is made possible, despite the use of plastic for the holding pocket. Due to its arrangement in the electrically insulating housing pocket, an inexpensive design can advantageously be used for the temperature monitor, e.g., a design without an external insulation of its own. Moreover, the temperature monitor can have a very compact, especially thin overall shape, so that even with a high degree of filling of the groove by the windings, it can be accommodated in the remaining free space of the stator groove by means of the correspondingly narrow holding pocket.

In an advantageous embodiment of the present invention, there are at least two, and preferably three, temperature monitors that are identically seated in their own holding pockets. The temperature monitors, with their associated holding pockets, are resiliently connected at different locations to the switching disk for engagement in different stator grooves. This embodiment, with preferably three temperature monitors, is particularly suited for a three phase motor design by separately monitoring the temperature of each motor phase winding. All the temperature monitors are conveniently connected in series to a motor electronics unit, which turns off the motor in case of an electrical change of state, in particular, an interruption of the circuit running through the temperature monitors.

In another advantageous embodiment, all the holding pockets are integrally connected to a common carrier part, and thus indirectly fixed to the switching disk by means of the carrier part. For this purpose, the carrier part is connected, or can be connected, to the switching disk, on the side of the switching disk facing the stator winding overhang, by means of snap-fit connections. Each holding pocket is preferably integrally and resiliently connected to the carrier part via a connecting web in the peripheral area of an insertion opening through which the temperature monitor is received. In addition, the carrier part advantageously also has fixation means for electrical connection lines/wires of the temperature monitor, as well as, in particular, electrical plug connectors. In this advantageous embodiment, the carrier part with the temperature monitors forms a fully preassembled and pre-wired module that need merely be snapped into the switching disk for fixation. This leads to an extremely easy and fast assembly by avoiding the expense of manual individual wiring of the temperature monitors. The plug connectors on the carrier part make the electrical connection to an electronics unit.

BRIEF DESCRIPTION OF THE DRAWINGS

The invention will be described in more detail below, based on a preferred exemplary embodiment illustrated in the drawings wherein:

FIG. 5 shows a separate perspective exploded view of the carrier part with the temperature monitors, their wiring and plug connectors;

FIG. 6 shows a view of the carrier part from the side of the carrier part facing the stator;

DETAILED DESCRIPTION

Figures 1, 2:
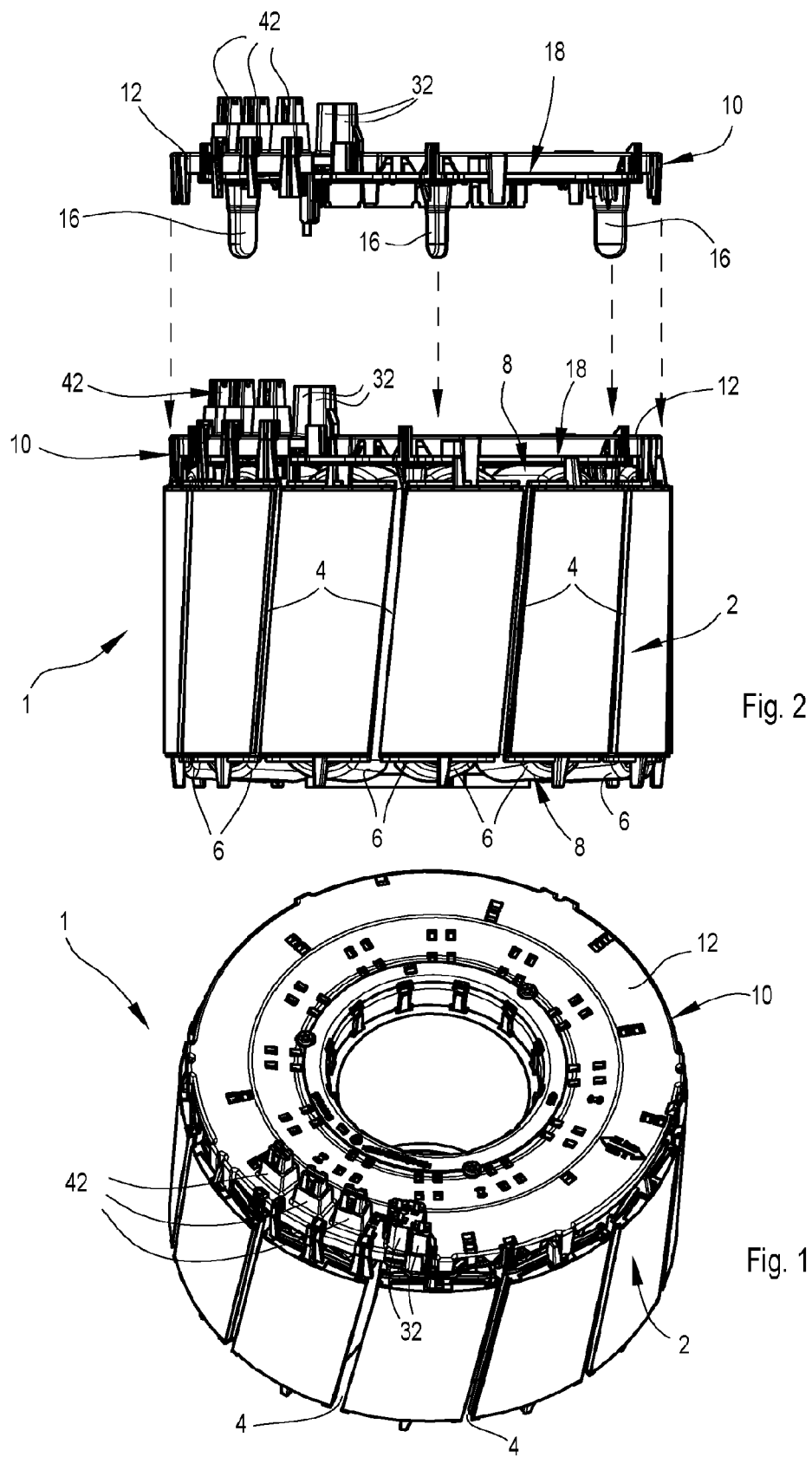
FIG. 1 shows a perspective view of a preassembled stator arrangement according to the present invention with an interconnection unit and its switching disk.
FIG. 2 shows a side view of the stator seen in FIG. 1 and also shows a separate side view of the interconnection unit, to illustrate the assembly connection.

In the various figures of the drawings, identical parts are always provided with identical reference numerals, so that only a single description of a part also applies analogously to other figures of the drawings in which the corresponding part can likewise be recognized by the corresponding reference numeral.

A stator arrangement 1, according to the present invention, principally includes a laminated stator core 2 with stator windings 6 running through stator grooves 4. The stator windings 6 run outside the stator grooves 4 in the area of the end faces of the laminated stator core 2, going from one groove to the next groove, and form winding overhangs 8 on each end face of the core 2. The stator arrangement 1 further has an interconnection unit 10 for electrically connecting the stator windings 6 to one another and to electric supply lines (not shown). The interconnection device 10 essentially consists of a circular or annular switching disk 12 lying in a plane perpendicular to the longitudinal axis of the stator and covering, on one end face of the stator, the area of the winding overhangs 8 formed by the stator windings 6. On its interior side, the side facing the winding overhangs 8, the switching disk 12 has electrical connector means for connecting the winding wire ends of the stator windings 6 to one another and to the supply lines. These connector means will be described in more detail below.

At least one temperature monitor 14 is mounted on the switching disk 12 (see FIG. 5) and operates to effectuate a temperature-dependent shut-off of the stator windings 6 during a malfunction. For this purpose, the temperature monitor 14 is an element that changes its state as a function of temperature. This can be a temperature-dependent resistor with a positive temperature coefficient (PTC) or with a negative temperature coefficient (NTC), or it can be a switching element that closes or opens as a function of the temperature.

In the illustrated embodiment, three temperature monitors 14 are provided (see FIG. 5). While fewer or greater temperature monitors 14 may be provided, this embodiment is particularly suitable for three phase motors, such as collectorless electronically commuted motors, whose three phase windings are electrically driven by means of a full bridge end stage. Each of the three temperature monitors 14 monitors one of the three phase windings for overheating.

According to the present invention, it is provided that each temperature monitor 14 is seated in a holding pocket 16 that is resiliently connected to the switching disk 12 in such a manner that the temperature monitor 14 essentially engages and contacts, via the holding pocket 16 located in one of the stator grooves 4, a respective stator winding 6 under a resilient pretension or biasing force. For the preferred embodiment with three temperature monitors 14, the associated holding pockets 16 used in the different stator grooves 4 are each resiliently movably connected to the switching disk 12. Each temperature monitor 14 is inserted, in a force fitting manner, into the associated holding pocket 16 with substantially zero clearance. Each holding pocket 16 has, on at least the side facing the respective stator winding 6, a wall formed sufficiently thinly such that the temperature monitor 14 is indirectly, but essentially, in thermally conductive surface contact with the stator winding 6.

Each holding pocket 16 preferably consists of an electrically insulating plastic material. The temperature monitor 14 itself can therefore be advantageously formed without electrical insulation of its own, which leads to a compact form and a lower cost.

In an advantageous embodiment, all of the holding pockets 16 are integrally connected to a common carrier part 18. The carrier part 18, together with the holding pockets 16, is preferably a one-piece molded plastic part. The carrier part 18 is connected, by means of snap-fit connections 20, to the switching disk 12 on the side of the switching disk 12 facing the stator winding overhang 8. Accordingly, the holding pockets 16 are indirectly, detachably connected to the switching disk 12 via the carrier part 18.

The carrier part 18 is substantially formed as a circular arc to match the annular shape of the switching disk 12, the holding pockets 16 being arranged at such points of the carrier part 18 that they automatically extend into and engage in the provided stator grooves 4 in order to make surface contact with the stator windings 6, when the switching disk 12 is axially placed on the laminated stator core 2. For this purpose, each holding pocket 16 has an elongated shape, axially projecting like a finger, with a closed end 22 located in the stator groove 4 and an insertion opening 24 facing the switching disk 12. In this regard, reference is particularly made to FIGS. 5 and 6. Each holding pocket 16 is resiliently connected to the carrier part 18 in the peripheral area of the insertion opening 24 via a connecting web 26. The connecting web 26 thus forms a type of articulation joint or connection for biasing and providing a resilient pivoting mobility to the holding pockets 16. In the remaining peripheral area of the insertion opening 24, there is no connection between the holding pockets 16 and the carrier part 18. In the area of the insertion opening 24 of each holding pocket 16, the carrier part 18 has a corresponding passage opening, so that each temperature monitor 14 can be easily inserted into the respective holding pocket 16, as seen in FIG. 5. The snap-fit connections 20 comprise external latching arms of the carrier part 18 that reach around an outer edge of the switching disk 12 with latching lugs. The carrier part 18 has engagement openings 20' on the inner peripheral edge, into which associated latching lugs of the switching disk 12 are received in a snap-fit engagement.

Figure 7:
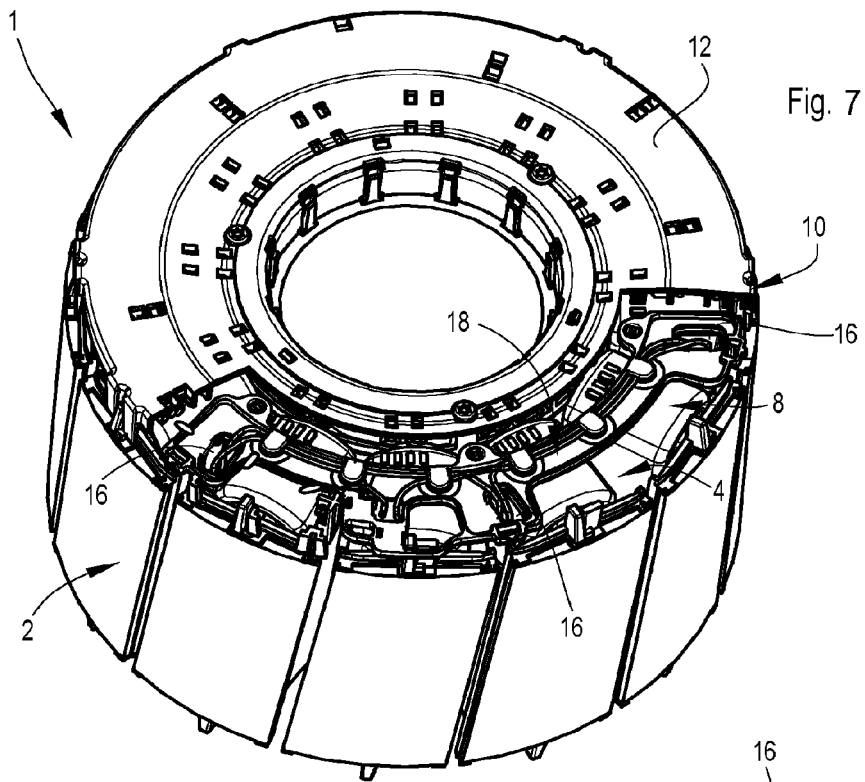
FIG. 7 shows a slightly enlarged illustration as in FIG. 1, with portions broken away from the switching disk to show the area underneath it.
Figure 8:
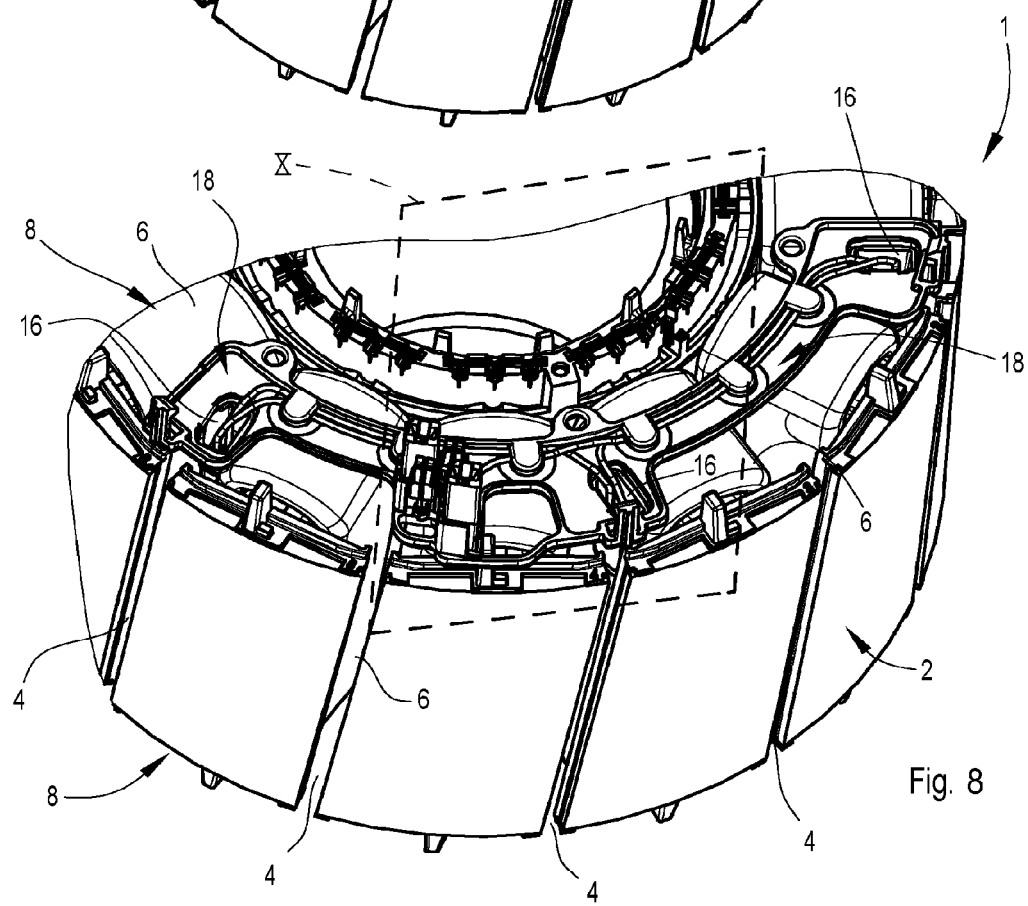
FIG. 8 shows an enlarged view of a portion of FIG. 7.
Figure 9:
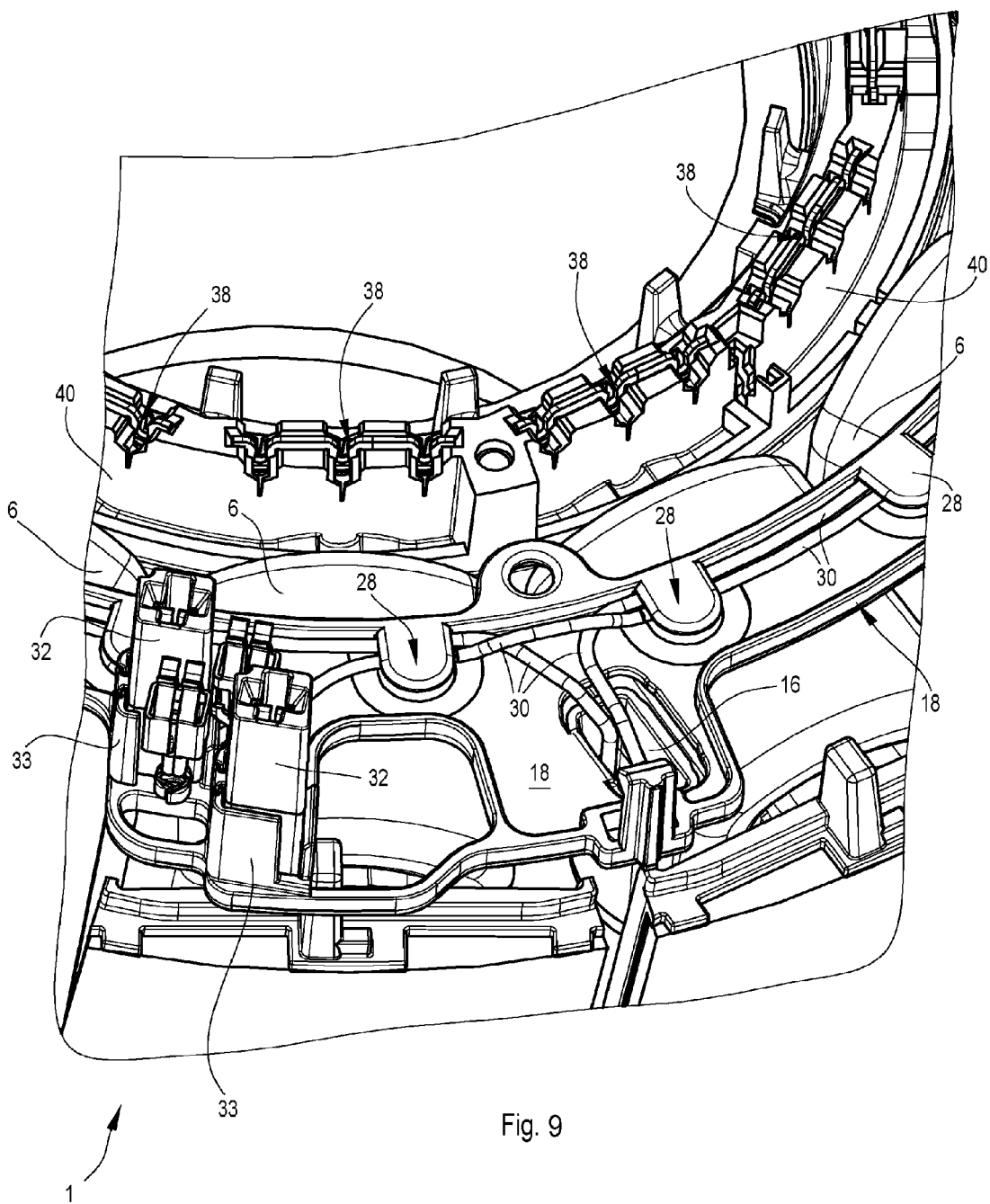
FIG. 9 shows an enlarged view of the area x seen in FIG. 8.

In another advantageous embodiment, the carrier part 18 also has suitable fixation means 28 for receiving and retaining electrical connection lines 30 of the temperature monitors 14, as well as, in particular, electrical plug connectors 32. Together with the temperature monitors 14, the carrier part 18 thus forms a preassembled, pre-wired module that can be easily installed by an axial insertion joining process. The plug connectors 32 project in a direction away from the winding overhangs 8 through openings or cutouts in the switching disk 12, as seen in FIG. 1. As can best be seen in FIGS. 7 and 9, the fixation means 28 advantageously includes a plurality of strap-like retaining sections under which the connection lines 30 can be introduced and positioned so that they are retained on the carrier part 18. The plug connectors 32 are preferably received into retaining receptacles 33 of the carrier part 18 and retained via a snap-fit engagement.

Figure 3:
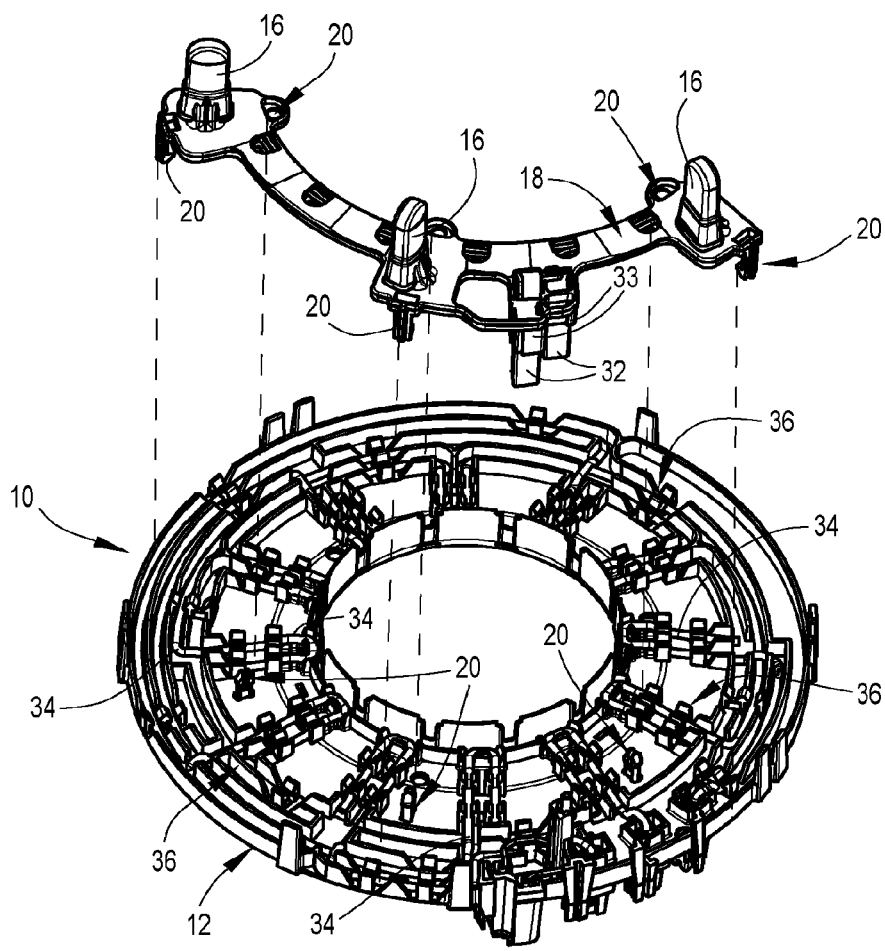
FIG. 3 shows a perspective exploded view of the interconnection unit with the switching disk and with a preferred temperature monitor carrier part, as viewed in the direction of the stator-side interior of the switching disk.
Figure 4:
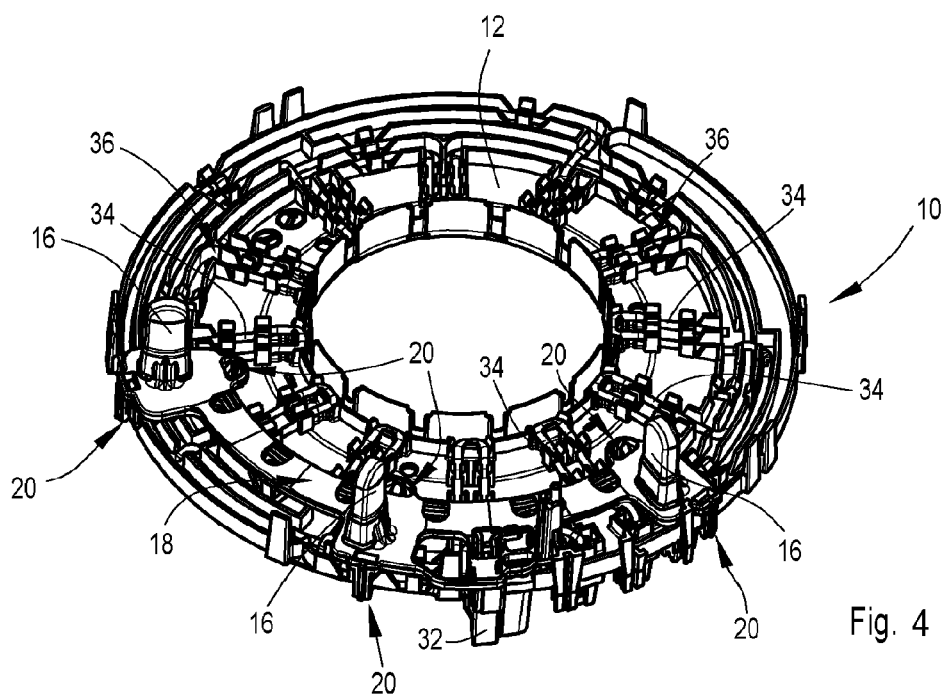
FIG. 4 shows a switching disk and carrier part of FIG. 3 in the preassembled state of these parts.

With regard to the briefly mentioned electrical connecting means of the switching disk 12 for interconnecting the stator windings 6, according to FIGS. 3 and 4, they include a plurality of wire conductors 34 that are introduced and fixed with a defined meandering course in the circumferential direction into fixation means 36 of the switching disk 12 in such a manner that they are contacted automatically by insulation displacement contacts 38 held in an injection-molded plastic stator casing 40 when the switching disk 12 is put in place on the laminated stator core 2. In this regard, reference is particularly made to the enlarged illustration in FIG. 9. The insulation displacement contacts 38 are preferably held in a defined circumferential distribution in an annular ridge-like projection of the injection-molded stator casing 40. Conveniently, the insulation displacement contacts 38 are additionally configured as double contacts in such a manner that the ends of the winding wires, not shown, of the stator windings 6 can also be contacted in the insulation displacement contacts 38. In this way, a defined interconnection of the windings can be achieved. In addition, the stator windings 6 can also be supplied by the motor electronic unit, not shown, with an operating voltage via the wire conductors 34. For this purpose, the wire conductors 34 are also connected to electrical plug connectors 42 that are arranged projecting on the outer side of the switching disk 12—in particular, adjacent to the plug connectors 32 of the temperature monitors 14. The preassembled stator arrangement 1 can thereby be connected to the motor electronics in a simple manner by an axial plug connecting process.

As further follows from FIGS. 3 and 4, the wire fixation means 36 consist of groove-like concentric channels running in the peripheral direction in a circular arc shape and of clamp retainers, particularly for radially running wire sections. In the areas where contact is made in the installation displacement contacts 38, anvil-like contact lugs for the wire conductors 34 are formed, which support the wire conductors 34 against the forces necessary for the contacts 38 to cut into the insulation during the joining process.

The invention has not been restricted to the illustrated and described exemplary embodiments, but also comprises all identically acting embodiments consistent with the invention. Moreover, the invention is not restricted to the combination of characteristics defined in claim 1, but can also be defined by any other desired combination of certain characteristics of all disclosed individual characteristics. This means that in principle almost each individual characteristic of claim 1 can be omitted and/or replaced by at least one individual characteristic disclosed at a different point of the application. To that extent, claim 1 is to be merely understood as a first attempt at formulating a claim covering the invention.

The invention claimed is:

1. A stator arrangement for an electric motor, the stator arrangement comprising:
   a laminated stator core and an interconnection unit;
   the laminated stator core having portions defining stator grooves extending between end faces, at least one stator winding extending through each of the stator grooves and the end faces to form a winding overhang at each of the end faces; and
   covering the stator winding overhangs on one end face of the stator core, the interconnection unit further including a switching disk and comprising at least one temperature monitor mounted thereon to monitoring the temperature of the stator windings, at least one holding pocket being resiliently connected to the switching disk and the temperature monitor being received within the holding pocket, the holding pocket positioned in one of the stator grooves and being resiliently biased into engagement with one of the stator windings therein, whereby the temperature monitor monitors the temperature of the stator winding engaged by the holding pocket.

2. The stator arrangement of claim 1, further comprising three temperature monitors and three holding pockets, each of the temperature monitors being identically and independently received with one of the holding packets, each of the holding pockets being resiliently engaged with one of the stator windings in a different one of the stator grooves, and each of the holding pockets being resiliently connected to the stator disk at different locations.

3. The stator arrangement of claim 2, wherein each of the temperature monitors is inserted with zero clearance in a force fitting manner into one of the holding pockets, each of the holding pockets having, at least on a side of the holding pocket engaged with the respective stator winding, a wall formed sufficiently thinly such that the temperature monitor is indirectly in thermally conductive surface contact with the stator winding.

4. The stator arrangement of claim 3, wherein the holding pockets have an elongated shape axially projecting with a closed end into the stator groove, the holding pockets further having an insertion opening facing the switching disk, wherein the holding pockets are resiliently connected in the peripheral area of the insertion opening via a connecting web to the switching disk.

5. The stator arrangement of claim 2, wherein the holding pockets are integrally connected to a common carrier part, the carrier part being connected by a snap-fit connection to the switching disk on a side of the switching disk facing the stator winding overhangs.

6. The stator arrangement of claim 5, wherein the carrier part has a fixation retainer engaged with one or both of electrical connection lines and electrical plug connectors of the temperature monitors.

7. The stator arrangement of claim 6, wherein the plug connectors project through the switching disk in a direction away from the winding overhangs.

8. The stator arrangement of claim 7, wherein the switching disk includes on its interior side facing the winding overhangs, an electrical connector connecting winding wire ends of the stator windings to one another and to electrical supply lines.

9. The stator arrangement of claim 8, wherein the electrical connector includes wire conductors that are fixed with a defined course in a fixation retainer of the switching disk in such a manner that they are contacted automatically by insulation displacement contacts held in an injection-molded plastic stator casing when the switching disk is placed on the laminated stator core.

10. The stator arrangement of claim 9, wherein the wire conductors are connected to electrical plug connectors that are arranged projecting on the outer side of the switching disk and adjacent to the plug connectors of the temperature monitors.

11. The stator arrangement of claim 5, wherein the holding pockets have an elongated shape axially projecting with a closed end into the stator groove, the holding pockets further having an insertion opening facing the switching disk, wherein the holding pockets are resiliently connected in the peripheral area of the insertion opening via a connecting web to the carrier part.

12. The stator arrangement of claim 11, wherein the carrier part has a fixation retainer engaged with one or both of electrical connection lines and electrical plug connectors of the temperature monitors.

13. The stator arrangement of claim 2, wherein the holding pockets have an elongated shape axially projecting with a closed end into the stator groove, the holding pockets further having an insertion opening facing the switching disk, wherein the holding pockets are resiliently connected in the peripheral area of the insertion opening via a connecting web to the switching disk.

14. The stator arrangement of claim 1, wherein the temperature monitor is inserted with zero clearance in a force fitting manner into the holding pocket, the holding pocket having, at least on a side of the holding pocket engaged with the stator winding, a wall formed sufficiently thinly such that the temperature monitor is indirectly in thermally conductive surface contact with the stator winding.

15. The stator arrangement of claim 1, wherein the holding pocket is formed of an electrically insulating plastic material.

16. The stator arrangement of claim 1, wherein the switching disk includes on its interior side facing the winding overhangs, an electrical connector connecting winding wire ends of the stator windings to one another and to electrical supply lines.

17. The stator arrangement of claim 16, wherein the electrical connector includes wire conductors that are fixed with a defined course in a fixation retainer of the switching disk in such a manner that they are contacted automatically by insulation displacement contacts held in an injection-molded plastic stator casing when the switching disk is placed on the laminated stator core.

18. The stator arrangement of claim 17, wherein the wire conductors are connected to electrical plug connectors that are arranged projecting on the outer side of the switching disk.

* * * * *